United States Patent [19]

Skarbo

[11] 3,855,090
[45] Dec. 17, 1974

[54] PROCESS FOR RECOVERING NICKEL SELECTIVELY

[75] Inventor: Roald R. Skarbo, Lexington, Mass.

[73] Assignee: Kennecott Copper Corporation, New York, N.Y.

[22] Filed: June 28, 1972

[21] Appl. No.: 266,981

[52] U.S. Cl. ............... 204/106, 204/107, 204/108, 204/112, 204/113, 423/24, 423/139, 75/101 BE

[51] Int. Cl. .... C22d 1/14, C22d 1/16, B01d 11/00, B01i 1/04

[58] Field of Search ........ 75/101 BE, 117; 423/139, 423/150, 24

[56] References Cited
UNITED STATES PATENTS

| | | | |
|---|---|---|---|
| 3,224,873 | 12/1965 | Swanson | 75/101 BE |
| 3,428,449 | 2/1969 | Swanson | 75/117 |
| 3,697,400 | 10/1972 | Pang | 75/101 BE |
| 3,440,036 | 4/1969 | Spinney | 75/117 |
| 3,455,680 | 7/1969 | Ashbrook | 423/42 X |
| 3,743,585 | 7/1973 | Lowenhaupt et al. | 204/112 |
| 3,752,745 | 8/1973 | Kane et al. | 75/119 |
| 3,761,249 | 9/1973 | Ritcey et al. | 75/119 |

*Primary Examiner*—Oscar R. Vertiz
*Assistant Examiner*—Brian E. Hearn
*Attorney, Agent, or Firm*—Kenway & Jenney; John L. Sniado; Lowell H. McCarter

[57] ABSTRACT

In a process wherein copper and nickel are recovered separately from an oxime extractant by separate stripping and electrowinning steps, nickel concentration in the copper electrowinning step is maintained below about 10 g/l by directing a portion of a metal-barren acid stream from the copper electrowinning step to the nickel stripping step. Low copper concentration in the aqueous stream from the nickel stripping step to the nickel electrowinning step is effected by maintaining the mole ratio of exchangeable hydrogen ion of the acid to nickel ion of the oxime between 1.8 and 2.2 in the nickel stripping step in accordance with the equation:

$(R^\circ_2 Ni)_{org.} + 2(H^+)_{aqu.} \rightarrow (2R^\circ H)_{org.} + (Ni^{++})_{aqu.}$ wherein R is the oxime organic moiety and $R_2Ni$ is a chelate of nickel and the oxime.

10 Claims, 1 Drawing Figure

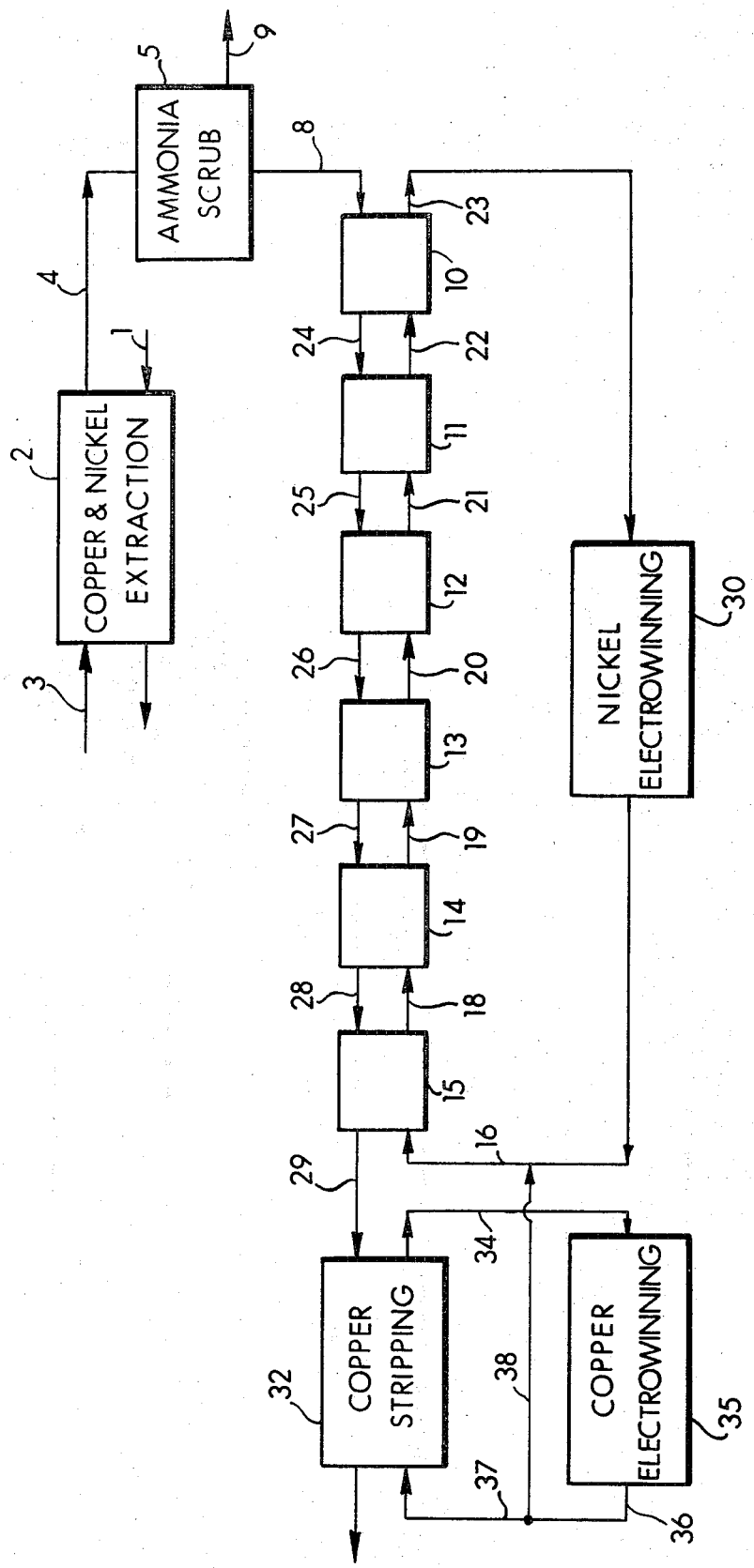

PROCESS FOR RECOVERING NICKEL SELECTIVELY

This invention relates to a method for selectively recovering substantially all of the nickel from an organic oxime solution containing nickel and copper.

Presently, organic oximes are employed to extract metals including copper and nickel from leach solutions containing these metals under conditions whereby only one metal is extracted by the oxime therein. Thus, separate extraction steps are required to recover all of the metals from the oxime each of which require additional steps such as stripping and electrowinning to recover the pure metal.

In a copending application Ser. No. 266,985 filed concurrently herewith in the name of Roald R. Skarbo and entitled "Selective Stripping Process" there is disclosed a stripping process for selectively stripping nickel from an oxime solution containing copper and nickel by contacting the oxime with an acid under controlled conditions of pH and oxime to acid mole ratio. The nickel is recovered from the acid by electrowinning and a copper-containing oxime stream is treated by acid stripping followed by electrowinning to recover pure copper. This stripping process offers substantial advantages over the prior art since both copper and nickel can be recovered selectively while employing only one extraction step and a low volume ratio of acid stream to oxime stream. However, even when employing either the selective extraction processes of the prior art or the selective stripping process described in the above-identified copending application, a small quantity of nickel is carried with the copper in the oxime stream into the copper stripping step and is stripped along with the copper by acid with which the oxime is contacted. Eventually, the aqueous acid stream cycled from the copper stripping step to the copper electrowinning step experiences a nickel buildup which must be reduced in order to maintain the efficiency of the copper electrowinning step.

It has been the practice of the prior art to remove a bleed stream from the copper-depleted acid stream recycled from the copper electrowinning step to the copper stripping step to maintain the nickel concentration at a desirably level of below about 10 grams per liter. This bleed stream is directed to a copper electrolysis step to recover copper therefrom which must be treated further to obtain pure copper. The aqueous stream from this electrolysis step is evaporated to recover a nickel acid salt such as nickel sulfate and the residual "black sulfuric acid" comprising sulfuric acid and nickel is discarded. The nickel sulfate then is treated to recover pure nickel such as by electrowinning. This process is undesirable since the copper and nickel obtained therefrom are in a form which requires a number of steps to obtain pure copper and nickel and the nickel is not recovered completely.

As used herein, the terms "first stripping stage" or "first stage" mean the stage in a multi-stage stripping process wherein metal-loaded oxime solution first is contacted with an aqueous acid solution. The terms "last stripping stage" or "last stage" mean the stage in a multi-stage stripping process wherein fresh aqueous acid stripping solution is contacted first with a metal-containing organic oxime solution and wherein a nickel-depleted oxime solution is removed. The remaining stages in the multi-stage stripping process are referred to herein as the intermediate stages.

In accordance with the present invention, nickel buildup in an aqueous acid stream cycled between a copper stripping step and a copper electrowinning step is prevented by directing a portion of a copper-barren acid stream from the copper electrowinning step to a nickel stripping step operated under conditions to assure that the acid therein, which contacts an oxime extractant in the presence of copper and nickel ion, selectively strips only the nickel. The portion of the copper-barren acid stream directed to the nickel electrowinning step is sufficient to maintain the nickel concentration in the copper electrowinning step below about 10 grams per liter. Any copper introduced into the acid in the nickel stripping step is extracted by the oxime at the conditions wherein nickel is stripped from the oxime selectively. By operating in this manner, an undesirable increase of nickel concentration in the copper-stripping — copper-electrowinning circuit is prevented without increasing copper concentration in the nickel stripping-nickel electrowinning circuit. In addition, substantially all the nickel is recovered while employing a minimum number of processing steps.

As disclosed in the above-identified concurrently filed patent application, selective nickel stripping is effected in a multistage countercurrent process by contacting the metal-loaded oxime stream with an aqueous acid stream at a volumetric ratio of aqueous stream to oxime stream so that a mole ratio of exchangeable hydrogen ion in the fresh aqueous stream to the last stage to nickel ion in the fresh oxime stream to the first stage is maintained between about 1.8 and 2.2 as defined by Equation I

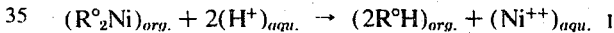
$$(R°_2Ni)_{org.} + 2(H^+)_{aqu.} \rightarrow (2R°H)_{org.} + (Ni^{++})_{aqu.} \quad 1$$

wherein R is the oxime organic moiety and $R_2Ni$ is a chelate of the nickel and oxime.

The process of this invention can be employed either with one oxime stream containing both nickel and copper or with two oxime streams each containing either nickel and copper. In either case, the nickel stripping step must be conducted under the conditions set forth above. It is preferred to employ one oxime stream containing both nickel and copper which is stripped to remove nickel and copper sequentially. By operating in this manner, any copper introduced into the nickel stripping-nickel electrowinning circuit can be removed therefrom with the nickel barren, copper-loaded oxime which is directed from the nickel stripping step to the copper stripping step.

This invention will be more fully described with reference to the accompanying figure.

An aqueous leach solution containing copper and nickel 1 is directed to a nickel-copper extraction step 2 wherein it is contacted with an organic oxime stream 3 in multistage countercurrent flow with sufficient oxime so that both the nickel and the copper are transferred from the aqueous stream to the organic stream. The metal-rich organic stream 4 is removed from the extraction step 2 and directed to an ammonia scrub step 5 wherein it is treated as for example by contact with ammonium bicarbonate to remove excess ammonia from the organic stream 4. The scrubbed organic stream 8 and an ammonia-rich aqueous stream 9 are removed from the ammonia scrub step 5. The ammonia is removed in scrub stage 5 to prevent precipitation of nickel ammonium sulfate in the stripping stages. When the oxime contains no ammonia such as when a leach solution other than ammoniacal solution is employed in the extraction step 2, the scrub step 5 need not be employed. The stream 8 is directed to the nickel stripping step where it is contacted in a plurality of stripping stages 10, 11, 12, 13, 14 and 15 in countercurrent flow with a metal-barren acid stream 16. Selective nickel stripping is effected by maintaining the mole ratio of the exchangeable hydrogen ion in the stream 16 to exchangeable nickel ion in the organic stream 8 between about 1.8 and 2.2 such that the pH of the acid stream 23 is maintained between about 1.0 and 4.0.

The copper and nickel concentrations in the acid stream are increased in the last stage 15 and the intermediate stages 14 and 13, but in the first stage 10 and intermediate stages 11 and 12 copper concentration in the aqueous stream is reduced while nickel concentration in the aqueous stream is increased further. The copper ion concentration in the organic stream increases in the last stage 15 and intermediate stage 14 while the nickel concentration in the organic stream is reduced as it is passed from the first stage 10 to the last stage 15. More nickel stripping stages could be employed to strip more nickel from this organic stream but the cost of extra stages may not be justified in view of the small amount of nickel remaining in the oxime stream.

The nickel-rich aqueous stream 23 is treated further to recover pure nickel therefrom such as an electrowinning step 30 from which the nickel-barren aqueous stream 16 can be recycled to the stripping stage 15. The electrowinning step usually is conducted in the presence of a buffer such as boric acid to maintain pH condition in the electrowinning step to assure formation of nickel cathodes with little or no precipitation of nickel compounds. The boric acid in the aqueous stream takes substantially no part in removing nickel from the organic stream in the stripping.

The copper-rich organic stream 29 is directed to a copper-stripping step 32 wherein it is countercurrently contacted in a plurality of stages with an aqueous acid solution such as sulfuric acid under conditions of pH and volumetric ratio of organic stream to aqueous stream to exchange hydrogen ion of the acid with copper ion bound by the oxime molecule and which forms a chelate therewith. The copper-loaded acid stream 34 then is directed to a copper recovery step 35, such as an electrowinning step to recover pure copper therefrom. The copper depleted acid stream 36 then is split; a portion 37 being directed to the copper stripping step 32 and the remaining portion 38 being directed to stripping stage 15. Stream 38 can be operated continuously or intermittently as desired so long as the nickel concentration in stream 34 is maintained below about 10 grams per liter. Any copper in stream 38 introduced into stripping stage 15 is extracted into the oxime 29 and removed with oxime stream 29 and recovered in copper electrowinning step 35.

Acids which can by employed in either the nickel stripping step or the copper stripping step are those which react with nickel or copper to form a water-soluble nickel or copper salt. Representative suitable acids include sulfuric acid, hydrochloric acid, nitric acid or mixtures thereof and may contain an acid buffer such as boric acid.

If desired, additional components may be added to the strip solution. Thus, when electrowinning is employed to recover pure metallic nickel, boric acid and a salt such as sodium sulfate or sodium chloride usually is added. Also, it is desirable to maintain the nickel concentration in the fresh acid stream to the stripping step between about 10 and 60 g/l to facilitate maintaining a relatively high nickel concentration in the electrolyte, thereby providing conditions which favor recovery of nickel in the form of coherent dense cathodes. When other nickel recovery steps are employed, the fresh acid stream to the nickel stripping step need not contain nickel. Thus, the nickel could be recovered by reacting the nickel strip concentrate with sodium carbonate and recovering nickel by decomposing the nickel carbonate formed and reducing the resultant oxide. It is to be understood that the nickel can be recovered by any conventional means for obtaining pure nickel from a nickel containing solution.

The oximes containing nickel and copper which can be stripped in acordance with this invention include α-hydroxy oximes, substituted hydroxy benzophenoximes, and mixtures thereof.

The α-hydroxy oxime component has the general formula

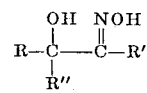

where R, R' and R'' may be any of a variety of organic hydrocarbon radicals such as aliphatic and alkylaryl radicals. R'' may also be hydrogen. Preferably, R and R' are unsaturated hydrocarbon or branched chain alkyl groups, containing from about 6 to 20 carbon atoms, R and R' are also preferably the same and, when alkyl, are preferably attached to the carbons substituted with the —OH and =NOH groups through a secondary carbon atom. It is also preferred that R'' is hydrogen or unsaturated hydrocarbon or branched chain alkyl groups containing from about 6 to 20 carbon atoms. The α-hydroxy oximes also preferably contain a total of about 14 to 40 carbon atoms. Representative compounds are 19-hydroxyhexatriaconta-9,27-dien-18-oxime, 5-10-diethyl-8-hydroxy-tetradecan-7-oxime, and 5,8-diethyl-7-hydroxy-dodecane-6-oxime. The latter compound has the following structural formula:

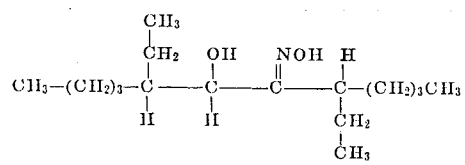

Representative of other mono- and polyunsaturated radicals are heptenyl, octenyl, decenyl, octadecenyl, octadecynyl and alkyl substituted radicals such as ethyloctadecenyl. Representative of other mono- and polyalkyl substituted saturated radicals are ethylhexyl, diethylheptyl, butyldecyl, butylhexadecyl, ethylbutyldodecyl, butylcyclohexyl and the like.

The α-hydroxy oxime component is also characterized as having a solubility of at least 2 percent by weight in the hydrocarbon solvent used to make up the organic phase and substantially complete insolubility in water.

The substituted benzophenoximes useful in the present invention have the following formula:

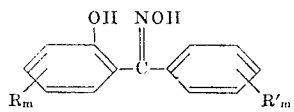

in which R and R' may be individually alike or different and are saturated aliphatic groups, ethylenically unsaturated aliphatic groups or saturated or ethylenically unsaturated aliphatic ether groups (i.e., — OR") and m and n are 0, 1, 2, 3 or 4 with the proviso that m and n are not both 0. The total number of carbon atoms in $R_m$ and $R'_n$ is from 3–25. R and R' contain 1 to 25 carbon atoms when saturated aliphatic and 3 to 25 carbon atoms when they are ethylenically unsaturated groups. Preferably, the position ortho to the phenolic OH substituted carbon atom is unsubstituted and also preferably the positions ortho to the oxime carbon atom on the other aromatic nucleus are unsubstituted. Branched chain saturated aliphatic hydrocarbon substituents are preferred. Compounds of the above type include the following:

2-hydroxy-3'methyl-5-ethylbenzophenoxime
2-hydroxy-5-(1,1-dimethylpropyl)-benzophenoxime
2-hydroxy-5-(1,1-dimethylethyl)-benzophenoxime
2-hydroxy-5-octylbenzophenoxime
2-hydroxy-5-nonyl-benzophenoxime
2-hydroxy-5-dodecyl-benzophenoxime
2-hydroxy-2',4'-dimethyl-5-octylbenzophenoxime
2-hydroxy-2',3',5'-trimethyl-5-octylbenzophenoxime
2-hydroxy-3,5-dinonylbenzophenoxime
2-hydroxy-4'-(1,1-dimethylethyl)-5-(2-pentyl)-benzophenoxime
2-hydroxy-4'-(1,1-dimethylethyl)-5-(2-butyl)-benzophenoxime
2-hydroxy-4-dodecyloxybenzophenoxime
2-hydroxy-4'-(1,1-dimethylethyl)-5-methyl-benzophenoxime
2-hydroxy-4',5-bis-(1,1-dimethylethyl)benzo-phenoxime When the α-hydroxy aliphatic oximes are employed in combination with the 2-hydroxy benzophenoximes, the α-hydroxy aliphatic oxime extractants having the following general formula may be used:

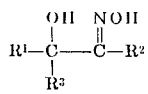

where $R^1$, $R^2$ and $R^3$ may be any of a variety of organic radicals such as aliphatic and alkylaryl radicals. $R^3$ may also be hydrogen. Preferably, $R^1$ and $R^2$ are unsaturated hydrocarbon or branched chain alkyl groups containing from about 6 to 20 carbon atoms. $R^1$ and $R^2$ are also preferably the same and when alkyl are preferably attached to the carbons substituted with the —OH and =NOH groups through a secondary carbon atom. It is also preferred that $R^3$ is hydrogen on unsaturated hydrocarbon or branched chain alkyl groups containing from about 6 to 20 carbon atoms. The α-hydroxy oximes also preferably contain a total of about 14 to 40 carbon atoms. Representative compounds are 19-hydroxyhexatriaconta-9,27-dien-18-oxime, 5,10-diethyl-8-hydroxytetradecan-7-oxime, and 5,8-diethyl-7-hydroxydodecane-6-oxime. The latter compound has the following structural formula:

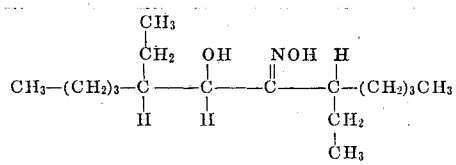

Representative of other mono- and polyunsaturated radicals are heptenyl, octenyl, decenyl, octadecenyl, octadecynyl and alkyl substituted radicals such as ethloctadecenyl. Representative of other mono- and polyalkyl substituted saturated radicals are ethylhexyl, diethylheptyl, butyldecyl, butylhexadecyl, ethylbutyldodecyl, butylcyclohexyl and the like. The $R^1$, $R^2$ and $R^3$ groups may contain inert substituents.

The relative amounts of the two extractants in the compositions of the present invention can be varied widely with even minute quantities of the α-hydroxy aliphatic oxime being beneficial. However, it is preferred to employ it in the range of 1 to 100 percent by weight based on the weight of the 2-hydroxy benzophenoxime, with the best results obtainable in the range of 15–50 percent. The amount of the extractants in the organic solvent likewise can vary within considerable limits. In general, however, the concentration of total oxime is in the range 2–25 percent, based on the weight of the organic extracting solution, preferably in the range of 5–15 percent.

These and other suitable oximes are disclosed for example by U.S. Pat. Nos. 3,224,873, 3,592,775, 3,455,680, 3,428,449, 3,276,863 and 3,197,274. The nickel and copper are introduced into the oxime to form a chelate therewith by contacting the oxime with an aqueous leach solution containing copper and nickel. Particularly suitable extractants are 2-hydroxy-4-nonyl-benzophenoxime which is a primary extractant in a composition also containing an α-hydroxy oxime sold by General Mills, Inc. under the tradename LIX-64N, 5,8-diethyl-7-hydroxy-6-dodecanone oxime which is the primary extractant in a composition sold by General Mills, Inc., under the tradename, LIX-63 and 2-hydroxy-4-dodecyl-benzophenoxime which is the primary extractant in a composition also containing an α-hydroxy oxime sold by General Mills, Inc. under the tradename LIX-64.

I claim:

1. A process for recovering pure copper and pure nickel from a water immiscible oxime extractant which comprises stripping an oxime extractant containing copper with an acid stream in a copper stripping step, said acid stream containing an acid of the type which forms a water soluble nickel salt or a water soluble copper salt when reacted with nickel or copper, cycling a copper-rich stream from the copper stripping step to a copper electrowinning step, stripping an oxime extractant containing nickel in a nickel stripping step by contacting the oxime extractant with an aqueous acid solution said contacting of said extractant and said acid solution causing nickel ion transfer from the oxime extractant to the aqueous solution and hydrogen ion transfer from the aqueous solution to the oxime extractant in accordance with the equation:

$(R°_2Ni)_{organic} + 2(H^+)_{aqueous} \rightarrow (2R°H)_{organic} + (Ni^{++})_{aqueous}$, where $R°$ is the oxime organic moiety, the mole ratio of hydrogen ion in the fresh aqueous acid solution to nickel ion in the fresh oxime extractant being maintained between about 1.8 and 2.2, cycling a nickel-rich stream from the nickel stripping step to a nickel electrowinning step and directing a portion of a copper depleted acid stream from said copper electrowinning step to said copper stripping step and the remainder of said copper depleted acid stream to said nickel stripping step at a rate sufficient to maintain the nickel concentration in said copper electrowinning step below about 10 grams per liter.

2. The process of claim 1 wherein the oxime stream to each stripping step comprises one oxime stream containing nickel and copper which is directed sequentially to said nickel stripping step and then to said copper stripping step.

3. The process of claim 1 wherein the oxime comprises 2-hydroxy-4-nonyl-benzophenoxime.

4. The process of claim 2 wherein the oxime comprises 2-hydroxy-4-nonyl-benzophenoxime.

5. The process of claim 1 wherein the oxime consists essentially of
a. a benzophenoxime of the formula

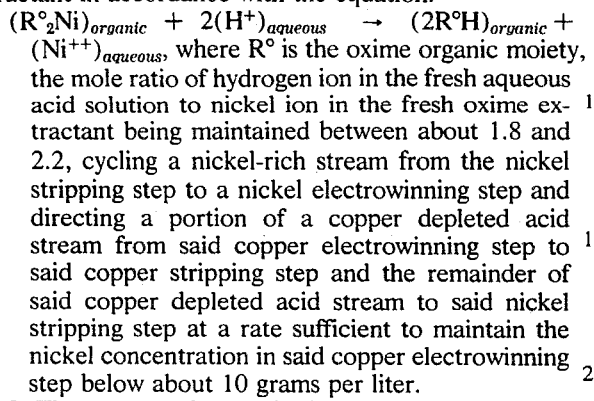

in which R and R' may be individually alike or different and are saturated aliphatic groups of 1–25 carbon atoms, ethylenically unsaturated aliphatic groups of 3–25 carbon atoms or —OR'' where R'' is a saturated or ethylenically unsaturated aliphatic group as defined, m and n are 0, 1, 2, 3 or 4 with the proviso that both are not 0 and the total number of carbon atoms in $R_m$ and $R'_n$ is from 3–25, and b. an α-hydroxy aliphatic oxime of the formula

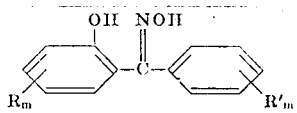

where $R^1$ and $R^2$ contain about 6 to 20 carbon atoms and are ethylenically unsaturated hydrocarbon or branched chain alkyl groups and $R^3$ is selected from the group consisting of hydrogen and ethylenically unsaturated hydrocarbon and branched chain alkyl groups of about 6 to 20 carbon atoms, said benzophenoxime (a) and α-hydroxy aliphatic oxime (b) being further characterized as being essentially insoluble in water and having a solubility of at least about 2 percent by weight in an essentially water immiscible organic solvent and said α-hydroxy aliphatic oxime (b) being present in the proportion of 1–100 percent based on the weight of the benzophenoxime (a).

6. The process of claim 2 wherein the oxime consists essentially of
a. a benzophenoxime of the formula

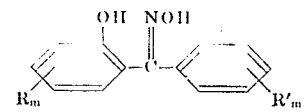

in which R and R' may be individually alike or different and are saturated aliphatic groups of 1–25 carbon atoms, ethylenically unsaturated aliphatic groups of 3–25 carbon atoms or —OR'' where R'' is a saturated or ethylenically unsaturated aliphatic group as defined, m and n are 0, 1, 2, 3 or 4 with the proviso that both are not 0 and the total number of carbon atoms in $R_m$ and $R'_n$ is from 3–25, and b. an α-hydroxy aliphatic oxime of the formula

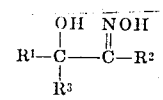

where $R^1$ and $R^2$ contain about 6 to 20 carbon atoms and are ethylenically unsaturated hydrocarbon or branched chain alkyl groups and $R^3$ is selected from the group consisting of hydrogen and ethylenically unsaturated hydrocarbon and branched chain alkyl groups of about 6 to 20 carbon atoms, said benzophenoxime (a) and α-hydroxy aliphatic oxime (b) being further characterized as being essentially insoluble in water and having a solubility of at least about 2 percent by weight in an essentially water immiscible organic solvent and said α-hydroxy aliphatic oxime (b) being present in the proportion of 1–100 percent based on the weight of the benzophenoxime (a).

7. The process of claim 1 wherein the oxime comprises an α-hydroxy oxime of the formula

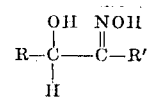

where R and R' are branched chain alkyl groups containing 6 to 20 carbon atoms attached to the carbons substituted with the —OH and =NOH groups through secondary carbon atoms, said oximes being further characterized as having a total carbon atom content of 14 to about 40.

8. The process of claim 2 wherein the oxime comprises an α-hydroxy oxime of the formula

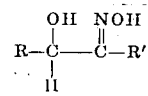

where R and R' are branched chain alkyl groups containing 6 to 20 carbon atoms attached to the carbons substituted with the —OH and =NOH groups through secondary carbon atoms, said oximes being further characterized as having a total carbon atom content of 14 to about 40.

9. The process of claim 1 wherein the oxime comprises 5,8-diethyl-7-hydroxy-6-dodecanone oxime.

10. The process of claim 2 wherein the oxime comprises 5,8-diethyl-7-hydroxy-6-dodecanone oxime.

* * * * *